United States Patent
Sones et al.

(10) Patent No.: US 8,284,988 B2
(45) Date of Patent: Oct. 9, 2012

(54) SYSTEM AND METHOD FOR DIMENSIONING OBJECTS USING STEREOSCOPIC IMAGING

(75) Inventors: Richard A. Sones, Cleveland Heights, OH (US); Kris Brumbaugh, Akron, OH (US); Michael Leo Kress, Uniontown, OH (US)

(73) Assignee: Applied Vision Corporation, Cuyahoga Falls, OH (US)

( * ) Notice: Subject to any disclaimer, the term of this patent is extended or adjusted under 35 U.S.C. 154(b) by 724 days.

(21) Appl. No.: 12/464,924

(22) Filed: May 13, 2009

(65) Prior Publication Data
US 2010/0290665 A1    Nov. 18, 2010

(51) Int. Cl.
G06K 9/00 (2006.01)
G06K 7/10 (2006.01)
G06K 7/00 (2006.01)
G01B 11/24 (2006.01)
G01B 11/14 (2006.01)

(52) U.S. Cl. ........ 382/101; 382/154; 356/601; 356/625; 235/454; 235/440

(58) Field of Classification Search .......... 382/154, 382/101; 356/601, 625; 235/454, 440
See application file for complete search history.

(56) References Cited

U.S. PATENT DOCUMENTS

| | | | |
|---|---|---|---|
| 5,530,420 A | | 6/1996 | Tsuchiya et al. |
| 5,555,090 A * | | 9/1996 | Schmutz .................. 356/601 |
| 5,719,678 A * | | 2/1998 | Reynolds et al. ......... 356/627 |
| 5,744,793 A | | 4/1998 | Skell et al. |
| 5,923,428 A * | | 7/1999 | Woodworth ............... 356/623 |
| 6,160,901 A * | | 12/2000 | Kage ......................... 382/107 |
| RE37,610 E | | 3/2002 | Tsuchiya et al. |
| 6,445,390 B1 | | 9/2002 | Aftosmis et al. |
| 6,480,301 B1 | | 11/2002 | Cholewo |
| 6,522,777 B1 * | | 2/2003 | Paulsen et al. ............. 382/154 |
| 6,603,563 B1 * | | 8/2003 | Gagliano .................... 356/601 |
| 7,058,204 B2 * | | 6/2006 | Hildreth et al. ............ 382/103 |
| 7,277,187 B2 * | | 10/2007 | Smith et al. ................ 356/601 |

(Continued)

FOREIGN PATENT DOCUMENTS

CA    2346278 A1    11/2002

(Continued)

OTHER PUBLICATIONS

CNS810—Capture package data quickly and accurately, www.mt.com/cargoscan, Jun. 2006, Mettler-Toledo, Inc., Columbus, OH.

(Continued)

*Primary Examiner* — Kathleen Y Dulaney
(74) *Attorney, Agent, or Firm* — Hahn Loeser & Parks LLP

(57) ABSTRACT

A method and configuration to estimate the dimensions of a cuboid. The configuration includes two image acquisition units offset from each other with at least one of the units positioned at a defined acquisition height above a background surface. Image processing techniques are used to extract a perimeter of a top surface of the cuboid, placed on the background surface, from pairs of acquired images. A height estimation technique is used to calculate an absolute height of the cuboid. The absolute height of the cuboid is used, along with the extracted perimeter of the top surface of the cuboid, to calculate an absolute length and an absolute width of the cuboid. The height, length, and width may be used to calculate an estimated volume of the cuboid.

17 Claims, 10 Drawing Sheets

U.S. PATENT DOCUMENTS

| | | | |
|---|---|---|---|
| 7,460,130 B2 * | 12/2008 | Salganicoff | 345/590 |
| 7,527,205 B2 * | 5/2009 | Zhu et al. | 235/462.14 |
| 7,583,275 B2 * | 9/2009 | Neumann et al. | 345/633 |
| 7,905,410 B2 * | 3/2011 | Good et al. | 235/462.01 |
| 8,131,015 B2 * | 3/2012 | Hildreth et al. | 382/103 |
| 8,132,728 B2 * | 3/2012 | Dwinell et al. | 235/454 |
| 2001/0028416 A1 * | 10/2001 | Divelbiss et al. | 349/43 |
| 2002/0118874 A1 * | 8/2002 | Chung et al. | 382/154 |
| 2002/0162886 A1 | 11/2002 | Arsenault et al. | |
| 2002/0164066 A1 * | 11/2002 | Matsumoto | 382/154 |
| 2004/0022418 A1 | 2/2004 | Oota | |
| 2004/0246333 A1 | 12/2004 | Steuart, III | |
| 2005/0117781 A1 * | 6/2005 | Aoyama | 382/103 |
| 2005/0259847 A1 * | 11/2005 | Genc et al. | 382/103 |
| 2007/0237356 A1 * | 10/2007 | Dwinell et al. | 382/101 |
| 2009/0118622 A1 * | 5/2009 | Durkin et al. | 600/473 |
| 2009/0318815 A1 * | 12/2009 | Barnes et al. | 600/473 |
| 2010/0061623 A1 * | 3/2010 | Yokoi et al. | 382/154 |

FOREIGN PATENT DOCUMENTS

| | | |
|---|---|---|
| DE | 19748062 A1 | 5/1999 |
| DE | 102004053416 A1 | 5/2006 |
| DE | 102007025373 B3 | 7/2008 |
| EP | 0364614 A1 | 4/1990 |
| EP | 0477078 A1 | 3/1992 |
| EP | 1100048 A1 | 5/2001 |
| ES | 2184541 A1 | 4/2003 |
| FR | 2783068 A1 | 3/2000 |
| GB | 191301535 A | 0/1913 |
| GB | 445716 A | 4/1936 |
| GB | 468481 A | 7/1937 |
| GB | 756994 A | 9/1956 |
| GB | 786534 A | 11/1957 |
| JP | 58130361 A | 8/1983 |
| JP | 63010280 A | 1/1988 |
| JP | 8210851 A | 8/1996 |
| JP | 2002044686 A | 2/2002 |
| JP | 2002148732 A | 5/2002 |
| KR | 10-2002-0037778 A | 5/2002 |
| KR | 10-2007-0068169 A | 6/2007 |
| KR | 10-2008-0035213 A | 4/2008 |
| KR | 10-2008-0095640 A | 10/2008 |
| WO | 9617258 A2 | 6/1996 |
| WO | 9934336 A1 | 7/1999 |
| WO | 2008057504 A2 | 5/2008 |

OTHER PUBLICATIONS

ExpressCube, www.expresscube.com, undated, ExpressCube, Ontario, CA, 2006.

CS5400 BarCoded YardStick—Easy measuring for getting started, www.mt.com/cargoscan, Dec. 2006, Mettler-Toledo Cargoscan AS, Inc., Norway.

* cited by examiner

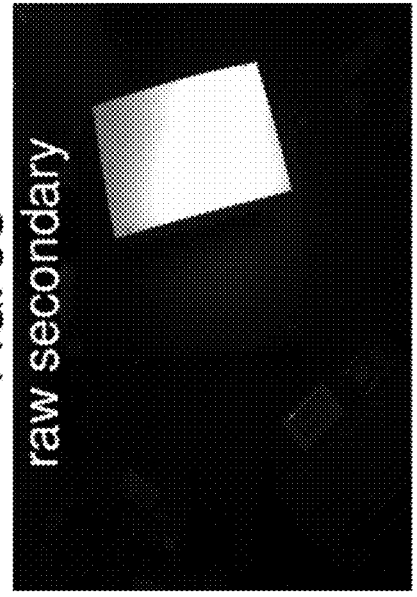
FIG. 3C raw secondary
FIG. 3D corrected secondary
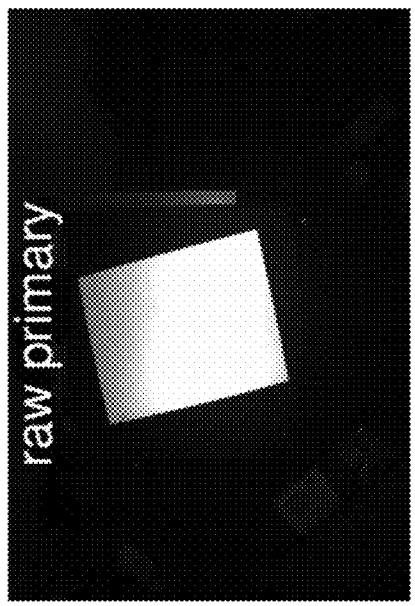
FIG. 3A raw primary
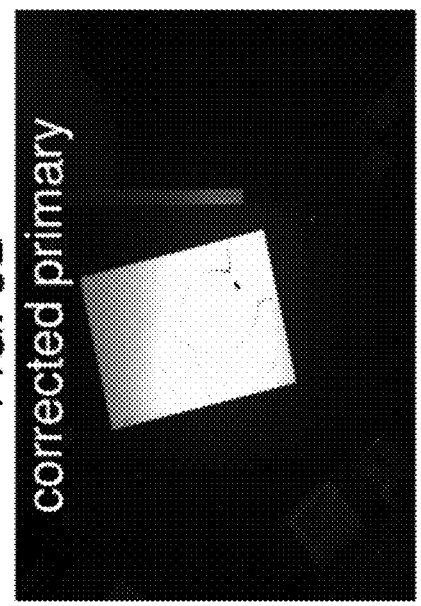
FIG. 3B corrected primary box edge image background edge image binarized subtraction

SYSTEM AND METHOD FOR DIMENSIONING OBJECTS USING STEREOSCOPIC IMAGING

TECHNICAL FIELD

Certain embodiments of the present invention relate to methods and apparatus for taking dimensional measurements of objects. More particularly, certain embodiments of the present invention relate to methods and apparatus for ascertaining three-dimensional measurements and/or volume of objects using stereoscopic imaging techniques.

BACKGROUND

Charges for shipping a package depend on both weight and volume. The manner in which volume is factored into the cost is called "dimensional weight" or "dim weight". Convenient ways for measuring the volume of a rectangular box (also called a rectangular prism or cuboid) are needed.

Thousands of packages are handled and shipped every day by shipping, courier, and delivery services. Such packages may originate at government agencies or private businesses of all sizes. In many cases, the fees by the carriers to their customers are based on the so-called "dim-weight factor" or "dimensional weight factor" (DWF) of the package being shipped. DWF is a fictitious dimension based on length (L) times width (W) times height (H) of a package, divided by a standard agency or association-recognized conversion factor. Even when an object or package is of irregular shape, the dim weight, using the longest measurement each of length, width, and height, is still used for billing purposes. The volume computed by the product of object length, width, and height may hereinafter be known as the "cubic volume," "spatial volume," or simply the "cube" of the object.

The measurements of the shipped packages may be necessary such that a carrier may accurately determine the number of vehicles which may be required to ship the packages to their destinations such that both customers and carriers may accurately estimate storage needs.

Package weight and measurements may also be used to determine and estimate weight and balance for transport vehicles such as aircraft, and to determine the loading sequence for packages by weight and dimensions for safety and efficiency purposes. Furthermore, if orders of any articles are to be packed into boxes, knowledge of article weight and dimensions may be useful for selecting the size and durability of the corresponding box.

In the past, it has been a common practice to manually measure boxes or other articles with a manual measurement tool such as a tape measure and perform a calculation for "dim weight" which is then provided to a carrier with the package. If a customer does not measure the articles, then the carrier may perform the measurement. Often, such manual measurements and calculations are done hurriedly. Therefore, there is a chance that the customer will be either undercharged or overcharged. In addition, there are many packages that are difficult, if not impossible, to determine even a grossly accurate manual measurement of dim weight. For example, many machine and automotive parts are shipped without packaging with tags attached or, at most, maybe bagged or shrink wrapped. Therefore, a ruler measurement to determine the greatest extent of each dimension is not accurate in such cases.

It is known that certain types of measuring systems for packages have been used. One measuring system has a base and two sides joining in a corner at 90-degree angles. Each side is marked with dimensional units (e.g., inches) such that a cubic package may be set on the base at the corner and measurements may be manually taken by looking at the markings and recording those markings. However, the accuracy of such manual measurements is limited by the care and eyesight of the measurer, and the time taken may be unreasonably long when many packages are being shipped, as is the case with large retailers.

Another measuring system employs photodetectors along three axes. Still another measuring system employs laser rangefinder technology. A further measuring system employs bar coding technology and provides a barcoded measuring strip on each axis.

Previous apparatus and methods have been extremely successful in the market and have, in fact, created commercial and industrial demand for dimensional measurement. However, these devices and methods have also indicated a need for some refinements which may further enhance their utility and accuracy. A quick, accurate, and cost-effective means and method for determining the dimensions and the cubic volume or spatial volume of packages in a commercial or industrial setting have been lacking for many situations.

Further limitations and disadvantages of conventional, traditional, and proposed approaches will become apparent to one of skill in the art, through comparison of such systems and methods with the present invention as set forth in the remainder of the present application with reference to the drawings.

SUMMARY

An embodiment of the present invention comprises a method to estimate the dimensions of a cuboid structure. The method includes acquiring a primary background image of a background surface, whereby the acquiring of the primary background image is accomplished from a primary acquisition position which is at a defined image acquisition height above the background surface. The method further includes acquiring a secondary background image of the background surface, whereby the acquiring of the secondary background image is accomplished from a secondary acquisition position which is offset from the primary acquisition position by a defined offset distance.

The method also includes positioning a cuboid structure onto the background surface such that a top surface of the cuboid structure is substantially parallel to the background surface and acquiring a primary cuboid image of the cuboid structure on the background surface, whereby the acquiring of the primary cuboid image is accomplished from the primary acquisition position. The method further includes acquiring a secondary cuboid image of the cuboid structure on the background surface, whereby the acquiring of the secondary cuboid image is accomplished from the secondary acquisition position.

The method also includes subtracting the primary background image from the primary cuboid image to form a primary subtraction image, and subtracting the secondary background image from the secondary cuboid image to form a secondary subtraction image. The method further includes spatially correlating at least one common feature of the primary subtraction image and the secondary subtraction image and estimating dimensions of the cuboid structure.

The method may further include correcting the primary background image, the secondary background image, the primary cuboid image, and the secondary cuboid image for optical distortion before forming the subtraction images. The method may also further include performing edge enhancement and edge extraction on the primary background image, the secondary background image, the primary cuboid image, and the secondary cuboid image before forming the subtraction images, as well as binarizing the images.

The method may also include dilating the edge enhanced and edge extracted background images before forming the subtraction images. The method may also include finding a best-fit rectangle within each of the primary subtraction image and the secondary subtraction image to define a primary rectangle and a secondary rectangle, each representing the top surface of the cuboid structure, before performing the spatial correlating.

Estimating the dimensions of the cuboid structure includes calculating a spatial image shift between the primary subtraction image and the secondary subtraction image using the common correlated feature and calculating an absolute (i.e., real world) height of the cuboid structure by applying a height estimation technique using at least the calculated spatial image shift and the image acquisition height. Estimating the dimensions of the cuboid structure further includes calculating an absolute length and an absolute width of the cuboid structure using the calculated absolute height and a best-fit rectangle extracted from at least one of the primary subtraction image and the secondary subtraction image. Estimating the volume of the cuboid structure includes calculating the estimated volume of the cuboid structure using the absolute length, the absolute width, and the absolute height.

The background surface may include a top surface of a scale capable of measuring a weight of the cuboid structure. The cuboid structure may include a package to be shipped. The method may further comprise measuring a weight of the cuboid structure and assigning a cost of shipping to the cuboid structure based on the estimated dimensions and the measured weight.

Another embodiment of the present invention comprises an image acquisition and processing configuration to estimate the dimensions of a package. The configuration includes a primary image acquisition unit positioned at a primary acquisition location, and a secondary image acquisition unit positioned at a secondary acquisition location which is offset from the primary acquisition position by a defined offset distance.

The configuration further includes a platform having a substantially horizontal top surface positioned substantially directly beneath the primary image acquisition unit such that the primary image acquisition unit is at a defined image acquisition height above the top surface of the platform. The configuration also includes a vision engine operatively connected to the image acquisition units. The vision engine is capable of triggering the image acquisition units to acquire background images of the top surface of the platform and package images of a top surface of a package placed on the top surface of the platform. The vision system is further capable of receiving the acquired images from the image acquisition units, storing the received images, and processing the received images to estimate length, width, and height dimensions of the package.

The platform may comprise a scale capable of weighing the package placed on the top surface of the platform. Alternatively, the configuration may further include a scale having the platform resting thereon and capable of weighing the package placed on the top surface of the platform.

Each of the image acquisition units may include a camera. The configuration may also include at least one illuminator positioned to illuminate the top surface of the platform and the top surface of the package placed on the platform, wherein the at least one illuminator is operatively connected to the vision engine and is capable of being turned on by the vision engine.

The at least one illuminator and the image acquisition units may each operate in at least one of an infrared range of wavelengths, an ultraviolet range of wavelengths, and a visible range of wavelengths. The configuration is capable of accommodating cuboid-shaped packages ranging in dimensions between 2 inches by 2 inches by one inch and 36 inches by 24 inches by 26 inches, in accordance with an embodiment of the present invention.

In accordance with an embodiment of the present invention, the processing performed by the vision engine includes correcting each of the acquired images for optical distortion to form a corrected primary background image, a corrected secondary background image, a corrected primary package image, and a corrected secondary package image. The processing performed by the vision engine further includes performing edge enhancement and edge extraction on each of the corrected images to form a primary background edge image, a secondary background edge image, a primary package edge image, and a secondary package edge image. The processing performed by the vision engine also includes subtracting the primary background edge image from the primary package edge image to form a primary subtraction image, and subtracting the secondary background edge image from the secondary package edge image to form a secondary subtraction image.

The processing performed by the vision engine further includes binarizing the subtraction images and finding a best-fit rectangle within the primary subtraction image to extract a primary rectangle representing the top surface of the package, and finding a best-fit rectangle within the secondary subtraction image to extract a secondary rectangle representing the top surface of the package. The processing performed by the vision engine also includes spatially correlating at least one common feature of the primary rectangle and the secondary rectangle and calculating a spatial image shift between the primary rectangle and the secondary rectangle using the common correlated feature.

The processing performed by the vision engine further includes calculating an absolute height of the package by applying a height estimation technique using at least the calculated spatial image shift and the image acquisition height. The processing performed by the vision engine also includes calculating an absolute length and an absolute width of the package using the calculated absolute height of the package and at least one of the primary rectangle and the secondary rectangle. The processing performed by the vision engine may further include calculating an estimated volume of the package using the absolute length, the absolute width, and the absolute height.

The configuration may optionally include an optical bandpass filter operatively connected to the primary image acquisition unit to reject ambient light. The configuration may further optionally include an optical bandpass filter operatively connected to the secondary image acquisition unit to reject ambient light. The configuration may optionally include a linear polarizer operatively connected to the at least one illuminator, a first cross-polarizer operatively connected to the primary image acquisition unit, and a second cross-polarizer operatively connected to the secondary image acquisition unit.

These and other advantages and novel features of the present invention, as well as details of illustrated embodiments thereof, will be more fully understood from the following description and drawings.

BRIEF DESCRIPTION OF THE DRAWINGS

FIGS. 3A-3D illustrate examples of raw and lens-distortion corrected images acquired and processed by the configuration of FIG. 1;

DETAILED DESCRIPTION

Embodiments of the systems and methods described herein provide automatic measurement of the dimensions of a cuboid or box-like object (e.g., a cardboard box or package). In accordance with an embodiment of a method herein, an operator places a box to be measured on a measurement table or scale. In accordance with another embodiment of the present invention, boxes are automatically forwarded to a measurement table or scale on a conveyor belt, for example.

Figure 1:
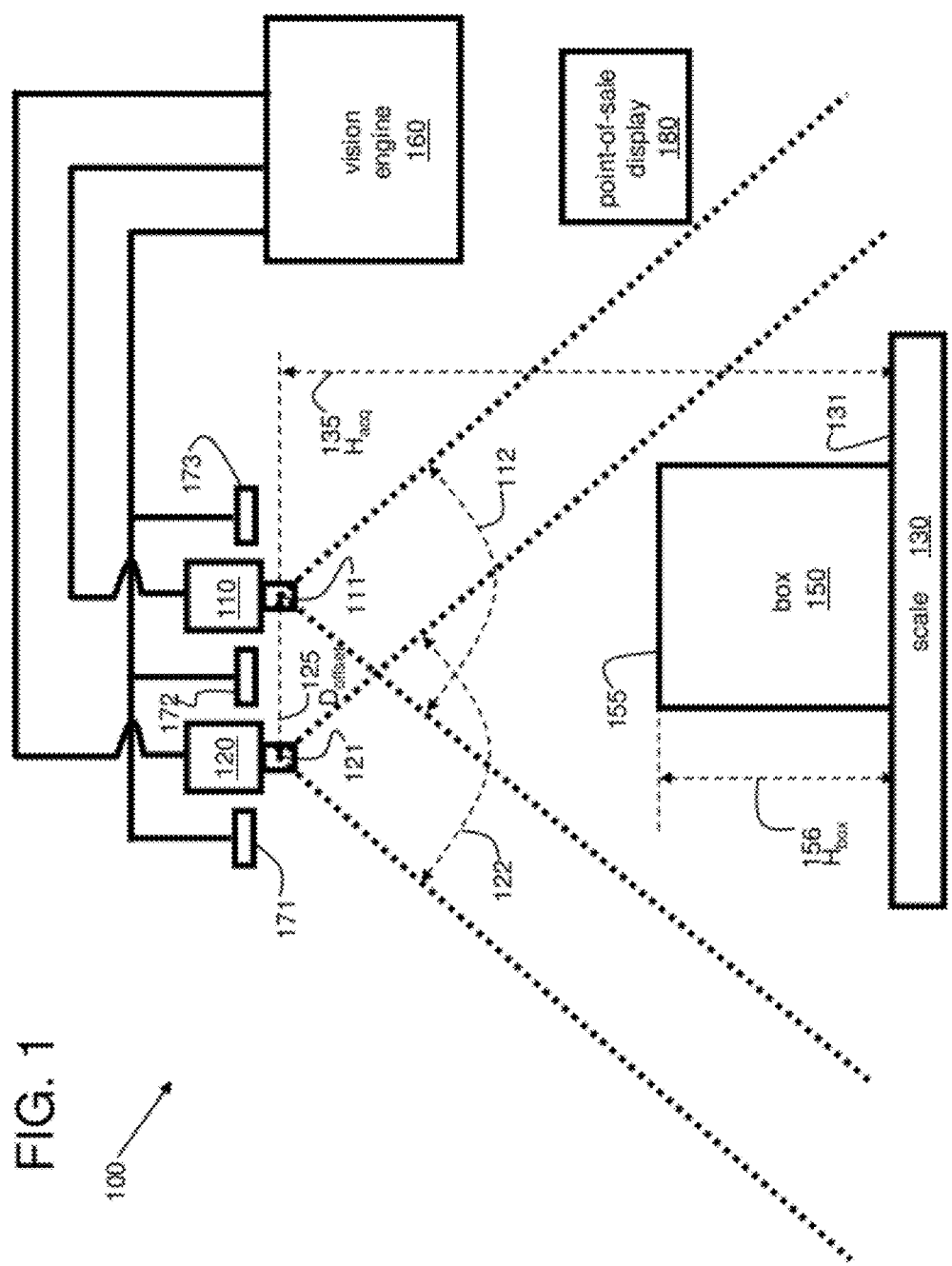
FIG. 1 illustrates an embodiment of an image acquisition and processing configuration for performing dimension estimation using stereoscopic imaging techniques and showing an example of an imaging geometry.

FIG. 1 illustrates an embodiment of an image acquisition and processing configuration 100 for performing dimension estimation using stereoscopic imaging techniques and showing an example of an imaging geometry. Such a configuration 100 may be established at a point-of-sale location (e.g., within a store) that ships packages (e.g., a Federal Express (Fed Ex) store, a United Parcel Service (UPS) store, a U.S. Post Office). The configuration 100 includes a primary image acquisition unit 110 positioned at a primary acquisition location 111. The configuration 100 also includes a secondary image acquisition unit 120 positioned at a secondary acquisition location 121. In accordance with one embodiment of the present invention, the locations 111 and 121 are both within a defined horizontal focal plane. However, such a restriction is not required. The secondary acquisition location 121 may be offset from the primary acquisition location 111 by a defined offset distance 125 ($D_{offset}$). In accordance with an embodiment of the present invention, the image acquisition units 110 and 120 are cameras.

The configuration 100 also includes a platform 130 having a substantially horizontal top surface 131 positioned substantially directly beneath the primary image acquisition unit 110 such that the position 111 of the primary image acquisition unit 110 is at a defined image acquisition height 135 ($H_{acq}$) above the top surface 131 of the platform 130. In the embodiment of FIG. 1, the platform 130 is a scale capable of weighing a cuboid-shaped package 150 (e.g., a box) positioned on the platform 130. In accordance with an alternative embodiment of the present invention, the configuration 100 may include a scale having the platform 130 resting thereon and capable of weighing a package 150 placed on the top surface 131. The terms package, box, and cuboid structure are used interchangeably herein. Embodiments of the present invention allow the cuboid structure 150 to be placed at any angle on the platform 130.

The primary image acquisition unit 110 includes a wide angle lens providing a field of view 112. Similarly, the secondary image acquisition unit 120 includes a wide angle lens providing a field of view 122. The fields of view 112 and 122, although shown in FIG. 1 as two-dimensional, are actually three-dimensional solid angles. The fields of view 112 and 122 overlap such that a defined maximum dimensioned package 150 falls within each field of view 112 and 122 when positioned on the platform 130. In accordance with an alternative embodiment of the present invention, the secondary image acquisition unit 120 is pointed inward toward the center of a nominal size package. This helps to ensure that a package will be within both fields of view 112 and 122. In accordance with an embodiment of the present invention, the configuration 100 is capable of accommodating cuboid-shaped packages ranging in dimensions between 2 inches by 2 inches by 1 inch to 36 inches by 24 inches by 26 inches (i.e., a defined maximum dimensioned package).

The configuration 100 further includes a vision engine 160 which is operatively connected to the image acquisition units 110 and 120. The vision engine 160 is capable of triggering the image acquisition units 110 and 120 to acquire background images of the top surface 131 of the platform 130, and package images of a top surface 155 of a package 150 placed on the top surface 131 of the platform 130. The vision engine 160 is further capable of receiving the acquired images from the image acquisition units 110 and 120, storing the received images, and processing the received images to estimate length, width, and height dimensions of the package 150. In accordance with certain embodiments of the present invention, the vision engine 160 may include a personal computer (PC) or a work station hosting a software application capable of performing the image acquisitions, image processing, and dimensional estimations as described herein. For example, the vision engine may have a software programmable processor or a hardware-based digital signal processor (DSP).

The system 100 further includes a point-of-sale display 180. In accordance with an embodiment of the present invention, the vision engine 160 is capable of wirelessly communicating with the display 180. For example, the vision engine may send estimated dimension information to the display 180 such that the display 180 may present the estimated dimension information to a user. The display may also present package weight information, dim-weight information, and shipping cost information to the user. In accordance with an alternative embodiment, the vision engine 160 is capable of communicating in a wired manner with the display 180. Such wireless and wired communication techniques are well known in the art.

The configuration 100 also includes illuminators 171, 172, and 173 positioned to illuminate the top surface 131 of the platform 130 and the top surface 155 of the package 150 when positioned on the platform 130. The illuminators 171, 172, and 173 are operatively connected to the vision engine 160 and are capable of being triggered (turned on during image acquisition) or turned on for an extended period of time and then turned off by the vision engine 160. In accordance with certain embodiments of the present invention, the illuminators 171, 172, 173 and the image acquisition units 110 and 120 operate in at least one of an infrared range of wavelengths, an ultraviolet range of wavelengths, and a visible range of wavelengths. Each of the illuminators may include, for example, an array of light emitting diodes (LEDs).

In accordance with an alternative embodiment of the present invention, a ring illuminator configuration is fitted in a coaxial manner around the primary image acquisition unit 110. In such an alternative configuration, the illuminators 171, 172, and 173 are not used. The ring illuminator configuration may be made of a plurality of LEDs that are slanted outward in a particular pattern to provide uniform illumination across the top of the box 150. In accordance with an embodiment of the present invention, a first circular row of the LEDs are slanted outward from vertical at an angle of about 15 degrees, a second circular row of the LEDs are slanted outward at an angle of about 28 degrees, and a third circular row of the LEDs are slanted outward at an angle of about 29 degrees.

In accordance with an alternative embodiment of the present invention, the system 100 includes a linear polarizer (not shown) positioned over the illuminators (or illuminator if only one), and a cross-polarizer (not shown) is positioned over the lens of the image acquisition units 110 and 120 to reject specular reflections. In this way, linearly polarized light is projected onto the box 150 and/or platform 130. The cross-polarizers only allow scattered light to pass through to the image acquisition units 110 and 120. Any specular or mirror-like reflections are rejected. This helps to reduce strong mirror-like reflections from, for example, a shiny platform 130 such as a scale which may degrade acquired images. Furthermore, as an option, an optical bandpass filter (not shown) may be positioned over the lens of the image acquisition units to reject ambient light.

Figure 2:
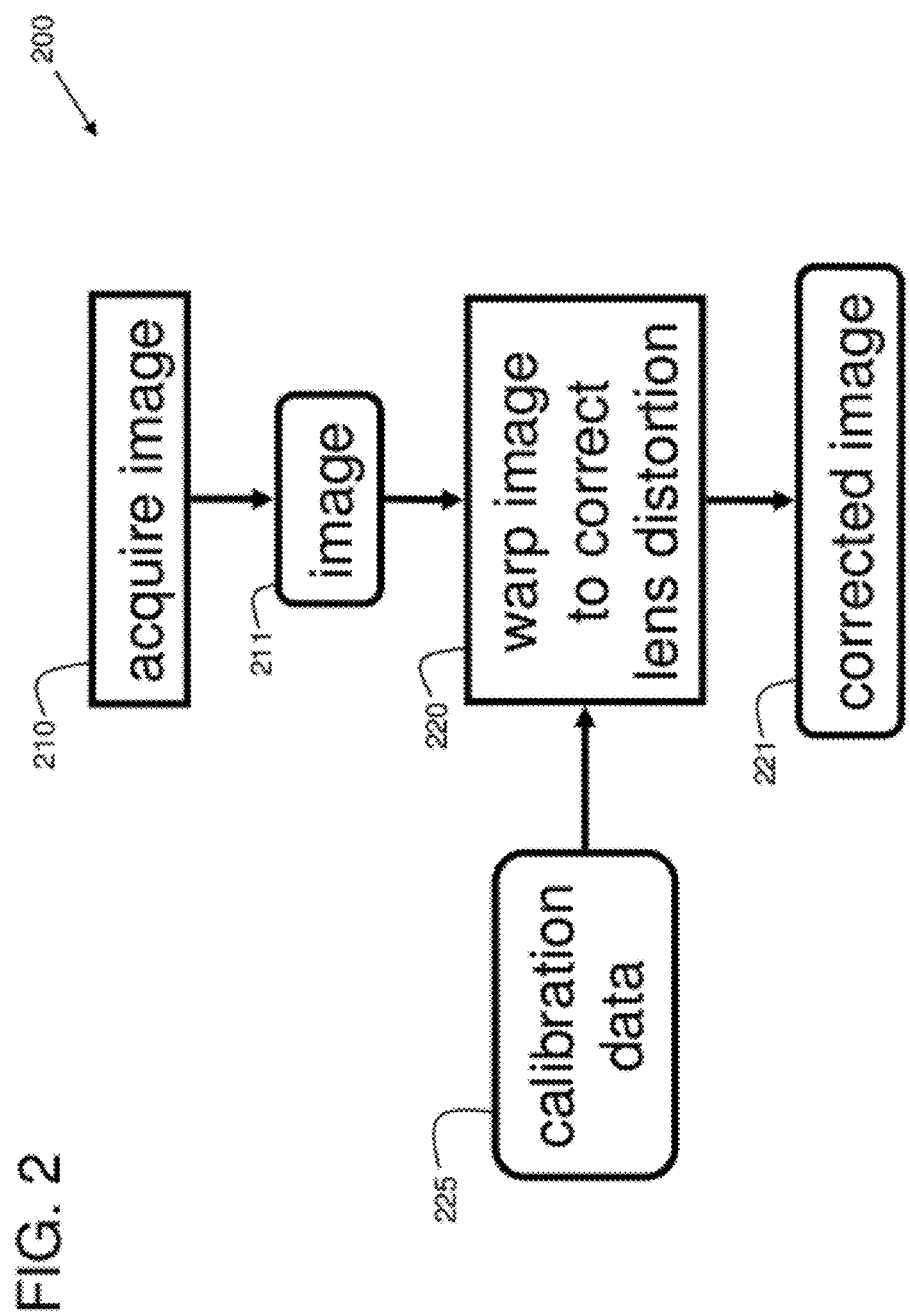
FIG. 2 illustrates a flow chart of an embodiment of a method for performing image acquisition and correction using the configuration of FIG. 1.

FIG. 2 illustrates a flow chart of an embodiment of a method 200 for performing image acquisition and correction using the configuration 100 of FIG. 1. In step 210, an image 211 is acquired using one of the image acquisition units 110 or 120. In step 220, the image 211 is corrected for optical distortion (e.g., distortion caused by the wide angle lens in the image acquisition unit) by applying calibration data 225, forming a corrected image 221. Such image correction techniques are well known in the art. For example, a one-time factory calibration may be performed which includes placing a known checkerboard pattern on the platform 130 and acquiring a calibration image of the checkerboard pattern. The vision engine 160 may be used to find the edge points within the acquired calibration image and determine a calibration transformation based on the known square sizes of the checkerboard.

In accordance with an embodiment of the present invention, four images are acquired using the method 200 of FIG. 2 in order to estimate the dimensions of a package 150. That is, the acquired image 211 may be a primary background image of the platform 130 acquired with the primary image acquisition unit 110, a secondary background image of the platform 130 acquired with the secondary image acquisition unit 120, a primary package image of the package 150 on the platform 130 acquired with the primary image acquisition unit 110, or a secondary package image of the package 150 on the platform 130 acquired with the secondary image acquisition unit 120.

For example, FIGS. 3A-3D illustrate examples of raw and lens-distortion corrected images acquired and processed by the configuration 100 of FIG. 1. A raw primary image is shown in FIG. 3A which was acquired with the primary image acquisition unit 110. The image in FIG. 3A appears curved or distorted due to the optical effect caused by the wide angle lens of the primary image acquisition unit 110. The corrected image is shown in FIG. 3B which results using the method 200 of FIG. 2. Similarly, a raw secondary image is shown in FIG. 3C which was acquired with the secondary image acquisition unit 120. The image in FIG. 3C appears curved or distorted due to the optical effect caused by the wide angle lens of the secondary image acquisition unit 120. The corrected image is shown in FIG. 3D which results using the method 200 of FIG. 2.

Figure 4:
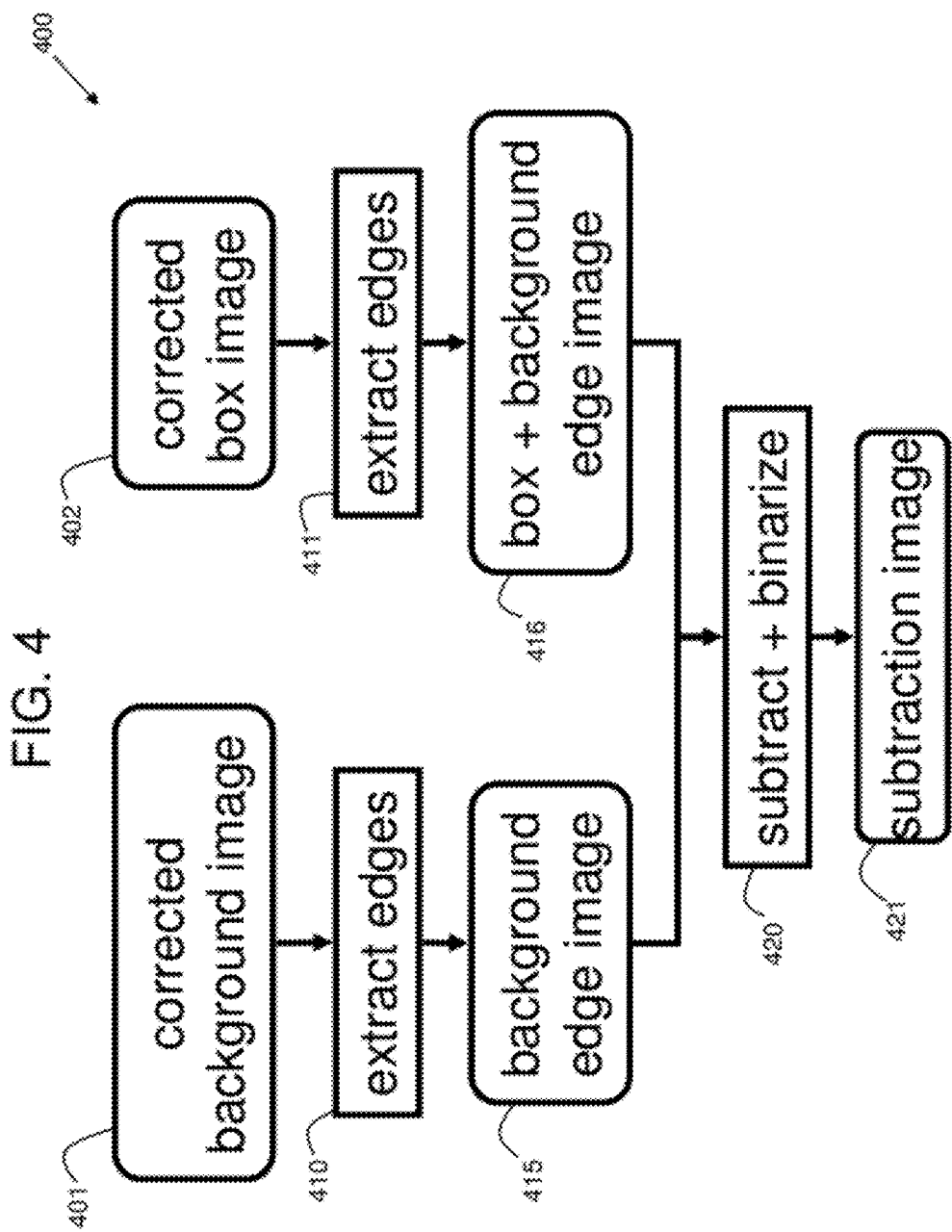
FIG. 4 illustrates a flow chart of an embodiment of a method for performing an extraction of a box edge image using the configuration of FIG. 1.

FIG. 4 illustrates a flow chart of an embodiment of a method 400 for performing an extraction of a box edge image using the configuration 100 of FIG. 1. In the method 400, a corrected background image 401 (e.g., a corrected primary background image) and a corrected package image 402 (e.g., a corrected primary package image) resulting from the method 200 of FIG. 2 are provided. In step 410, the corrected background image 401 is image processed to extract edges from the background image 401 to produce a background edge image 415. Similarly, in step 411, the corrected package image 402 is image processed to extract edges from the package image 402 to produce a package edge image 416 (note that a portion of the background platform 130, that is not covered by the box 150, will appear in the corrected package image 402 and, therefore, in the resultant package edge image 416). The steps 410 and 411 of edge extraction may include performing edge enhancement of the images 401 and 402 (e.g., digital high-pass or band-pass filtering).

In step 420, the background edge image 415 is subtracted from the package edge image 416 to form a subtraction image 421. As a result, the resultant subtraction image 421 substantially includes only edge information from the top surface of the package 150. The background information has been subtracted out. The edge information from the top surface 155 of the package 150 may include the four edges of the package (i.e., the perimeter of the top surface 155) as well as other edges that may be due to, for example, markings, slits, or tape on the top surface 155 of the package 150. In accordance with an embodiment of the present invention, the method 400 is performed for a background image and a package image acquired from the primary acquisition unit 110, and for a background image and a package image acquired from the secondary acquisition unit 120. As a result, a primary subtraction image is formed and a secondary subtraction image is formed. The subtraction images may be binarized (i.e., transformed into two-color black and white images) using thresholding and scaling techniques.

Figure 5A:
FIGS. 5A-5C illustrate an example of a binarized image subtraction process using the configuration of FIG. 1.
Figure 5B:
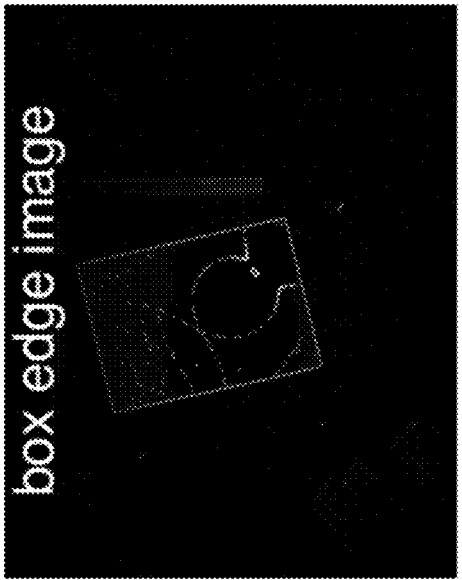
Figure 5C:
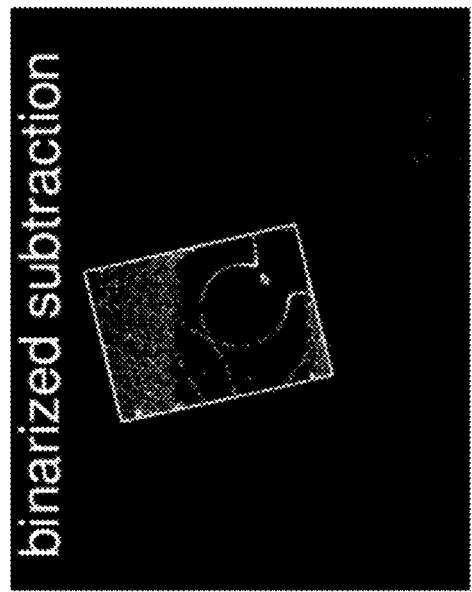

FIGS. 5A-5C illustrate an example of a binarized image subtraction process using the configuration 100 of FIG. 1. FIG. 5A shows an edge image of a box on a background surface where the edges have been extracted (i.e., only the edges are shown). Similarly, FIG. 5B shows an edge image of the background surface (without the box) where the edges have been extracted (i.e., only the edges are shown) and a dilation operator has been applied to the extracted edges to blur the background edge image. This makes the edges appear larger than they actually are such that they will more robustly subtract from the foreground edge image of the box on the background. FIG. 5C shows the resultant subtraction image where the background edge image of FIG. 5B has been subtracted from the box edge image of FIG. 5A. The background detail has been subtracted out. Only edges caused by the top surface of the box remain in the image of FIG. 5C. Furthermore, the image of FIG. 5C has been binarized.

Figure 6:
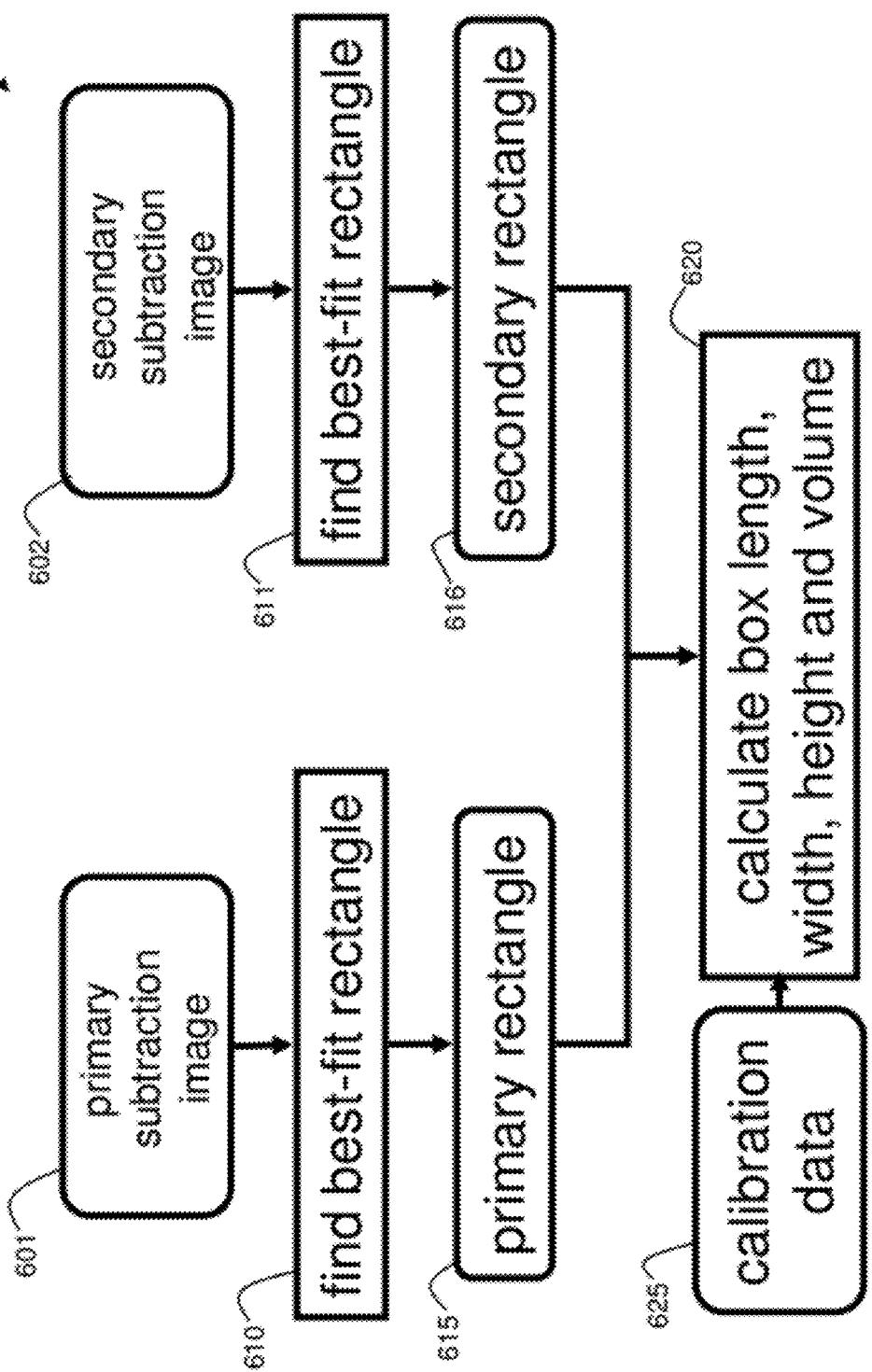
FIG. 6 illustrates a flow chart of an embodiment of a method for performing volume calculation using the configuration of FIG. 1.

FIG. 6 illustrates a flow chart of an embodiment of a method 600 for performing volume calculation using the configuration 100 of FIG. 1. In the method 600, a primary subtraction image 601 and a secondary subtraction image 602, resulting from the method 400 of FIG. 4, are provided. In step 610, the primary subtraction image is processed to find a best-fit rectangle (primary rectangle 615), representing a perimeter of the top surface of the package 150. Similarly, in step 611, the secondary subtraction image is processed to find a best-fit rectangle (secondary rectangle 616), representing a perimeter of the top surface of the package 150. The primary and secondary rectangles may each be found using a least mean square (LMS) best-fit technique, for example. A confidence value may be calculated (representing an error metric) to indicate how closely the edge points match a rectangle. If the confidence is too low, the edge extraction processing may be performed again (e.g., using a different threshold level), or new images may be acquired and the process repeated in its entirety, or the user may be cued to rotate the box to a different angle on the platform and start the entire process again.

In general the configuration 100 does not require that the color of the box be different from the color of the background platform to work successfully. In accordance with an embodiment of the present invention, the configuration 100 may start with a particular group of image processing settings and then interate through successive groups of image processing settings until a group is found that provides acceptable edge detection results. For example, predefined groups of settings may be provided for different types of box/background contrasts. Furthermore, dynamic thresholding techniques using, for example, a moving kernel may be provided by the vision engine 160 in order to obtain improved edge detection and extraction.

In step 620, length, width, height, and volume of the package 150 may be calculated. The length and width (in terms of number of pixels) of the package 150 are found from the primary rectangle 615 and/or the secondary rectangle 616. The absolute (i.e., real world) height 156 ($H_{box}$) of the package 150 (e.g., in inches or millimeters) may be found by applying a height estimation technique using the image acquisition height 135 ($H_{acq}$) and a spatial image shift S between the primary rectangle 615 and the secondary rectangle 616. Calibration data 625 are also applied. Since the image acquisition units 110 and 120 are spatially separated by the offset distance 125 ($D_{offset}$), a spatial image shift S will occur between the two rectangles 615 and 616. The spatial image shift S may be found by spatially correlating (i.e., finding like points) at least one common feature (e.g. a corner or an edge) of the primary rectangle 615 and the secondary rectangle 616 with respect to some coordinate system (e.g., a coordinate system having an origin at an upper left hand corner of the image). The absolute height 156 ($H_{box}$) of the box 150 may then be found using the following equation:

$$H_{box}=A[H_{acq}-\alpha/(S-\beta)]+C,$$

where A is a scaling factor, S is the measured spatial image shift, α and β are height calibration constants (i.e., calibration data 625), and C is an offset constant.

The height calibration constants α and β are determined apriori by measuring calibration boxes of varying known heights, recording the spatial image shift S of one or several points in the images representing a correlated common feature, plotting the distance from the height of the primary image acquisition unit 110 to the top of the box, and fitting a curve to the plot to generate the height calibration constants.

Figure 7:
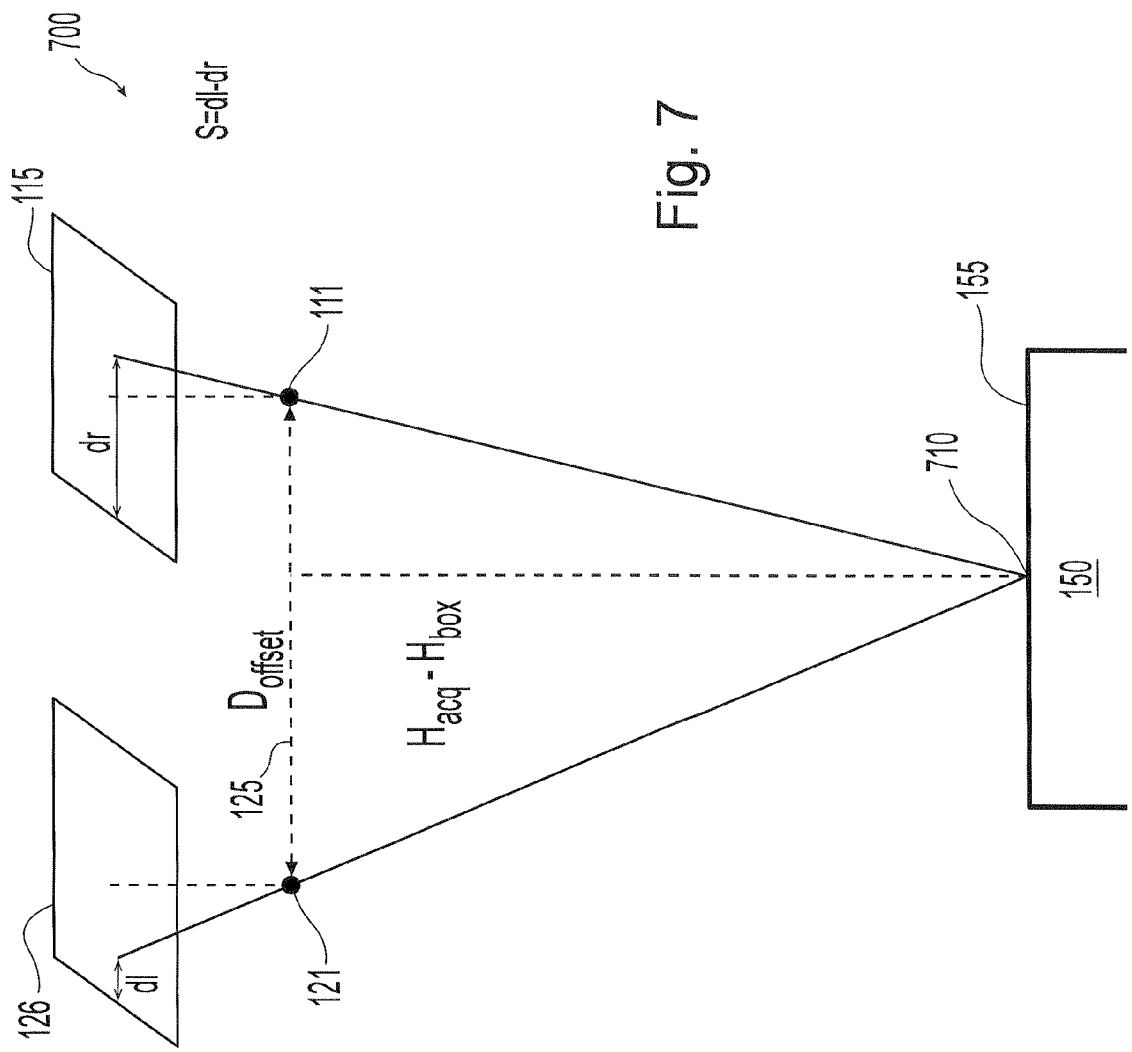
FIG. 7 illustrates an example of a stereoscopic imaging geometry showing how the height of a box may be estimated, in accordance with an embodiment of the present invention.
Figure 8:
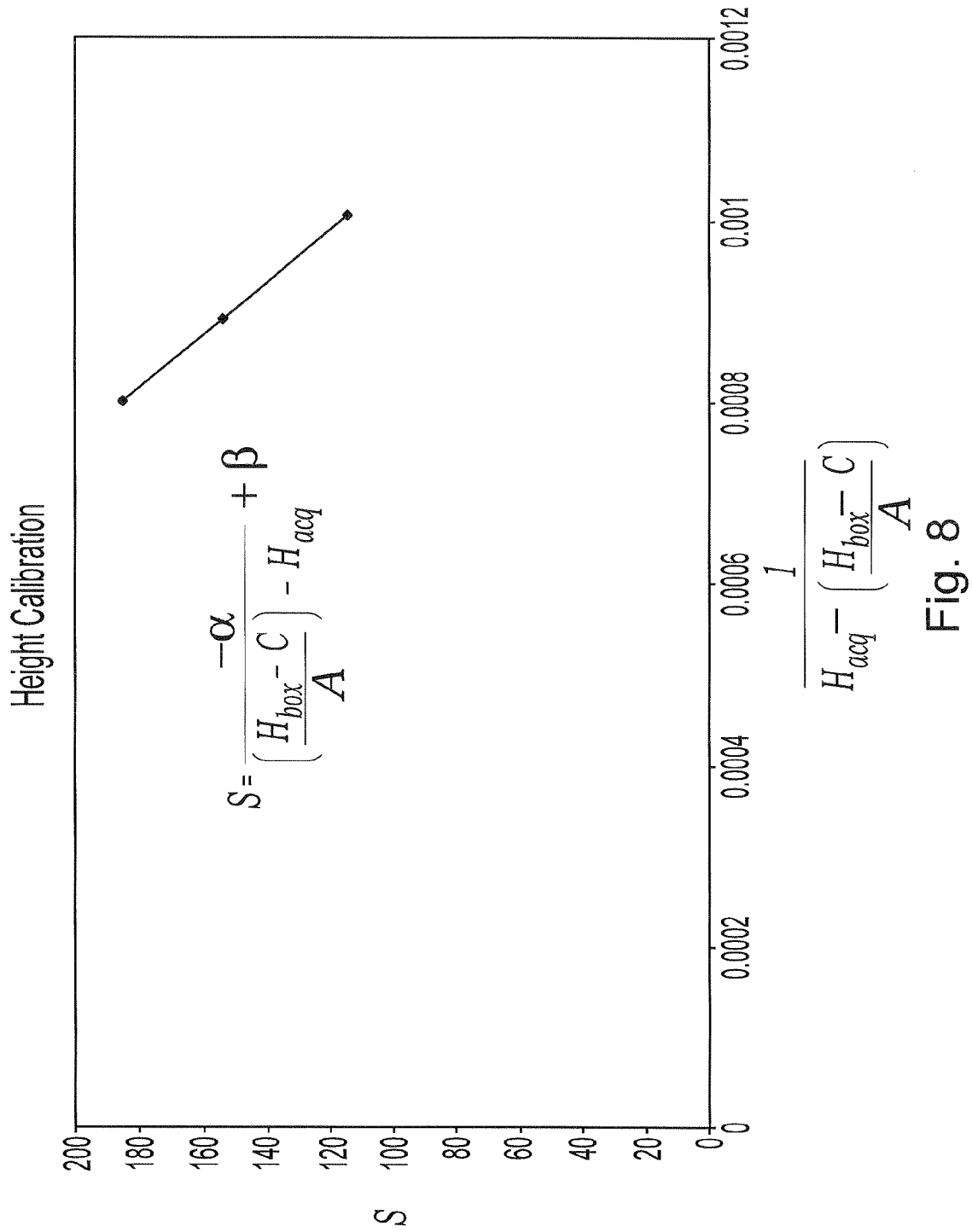
FIG. 8 is a plot illustrating the relationship of spatial image shift S to $H_{box}$ and $H_{acq}$.

FIG. 7 illustrates an example of a stereoscopic imaging geometry 700 showing how the height of a box may be estimated, in accordance with an embodiment of the present invention. From FIG. 1, the offset between the two acquisition locations 111 and 121, $D_{offset}$, is shown in the horizontal focal plane. A correlated point 710 on the top surface 155 of the box 150 will project onto a pixel array 115 of the primary image acquisition unit 110 at a displaced distance dr from the left edge of the pixel array 115. Similarly, the correlated point 710 will project onto a pixel array 126 of the secondary image acquisition unit 120 at a displaced distance dl from the left edge of the pixel array 126. The resultant spatial image shift S is the difference between dl and dr. Again, the absolute height 156 ($H_{box}$) of the box 150 is found using the following equation:

$$H_{box}=A[H_{acq}-\alpha/(S-\beta)]+C,$$

where A is a scaling factor, S is the measured spatial image shift (dl-dr), α and β are the height calibration constants (i.e., calibration data 625), and C is an offset constant. In accordance with an embodiment of the present invention, A=1 and C=0. FIG. 8 is a plot illustrating the relationship of the spatial image shift S to $H_{box}$ and $H_{acq}$. The slope of the resultant linear plot is defined by α and the intercept is defined by β.

The accuracy of the height calculation may be increased by, for example, increasing the offset distance between the cameras or by increasing the number of pixels in the acquired images. Furthermore, sub-pixel box edge detection may be improved using advanced image processing techniques.

Once $H_{box}$ is determined, the absolute length $L_{box}$ and width $W_{box}$ of the box 150 may then be found using the following equations:

$$L_{box}=(mH_{box}+b)L_{pixels},$$

$$W_{box}=(qH_{box}+p)W_{pixels},$$

where m, b, q, and p are system calibration constants (i.e., calibration data 625), $L_{pixels}$ is the length of the box in pixels, and $W_{pixels}$ is the width of the box in pixels as determined from at least one of the best-fit rectangles.

To determine the system calibration constants apriori, boxes of known dimensions with differing heights are measured and the length and width in pixels is recorded. The length and width are calibrated by first dividing the known lengths and widths in real world (i.e., absolute) units with pixel lengths and widths. This quantity is then plotted verses the known height. A curve is then fitted to the plot to generate the system calibration constants m, b, q, and p. The volume of the box may then be calculated as $V_{box}=H_{box} \times L_{box} \times W_{box}$. Once the volume of the box is estimated and the weight of the box is measured (e.g., using a scale), the volume and the weight may be used as inputs to a look-up-table to determine a corresponding cost for shipping the box.

Figure 9A:
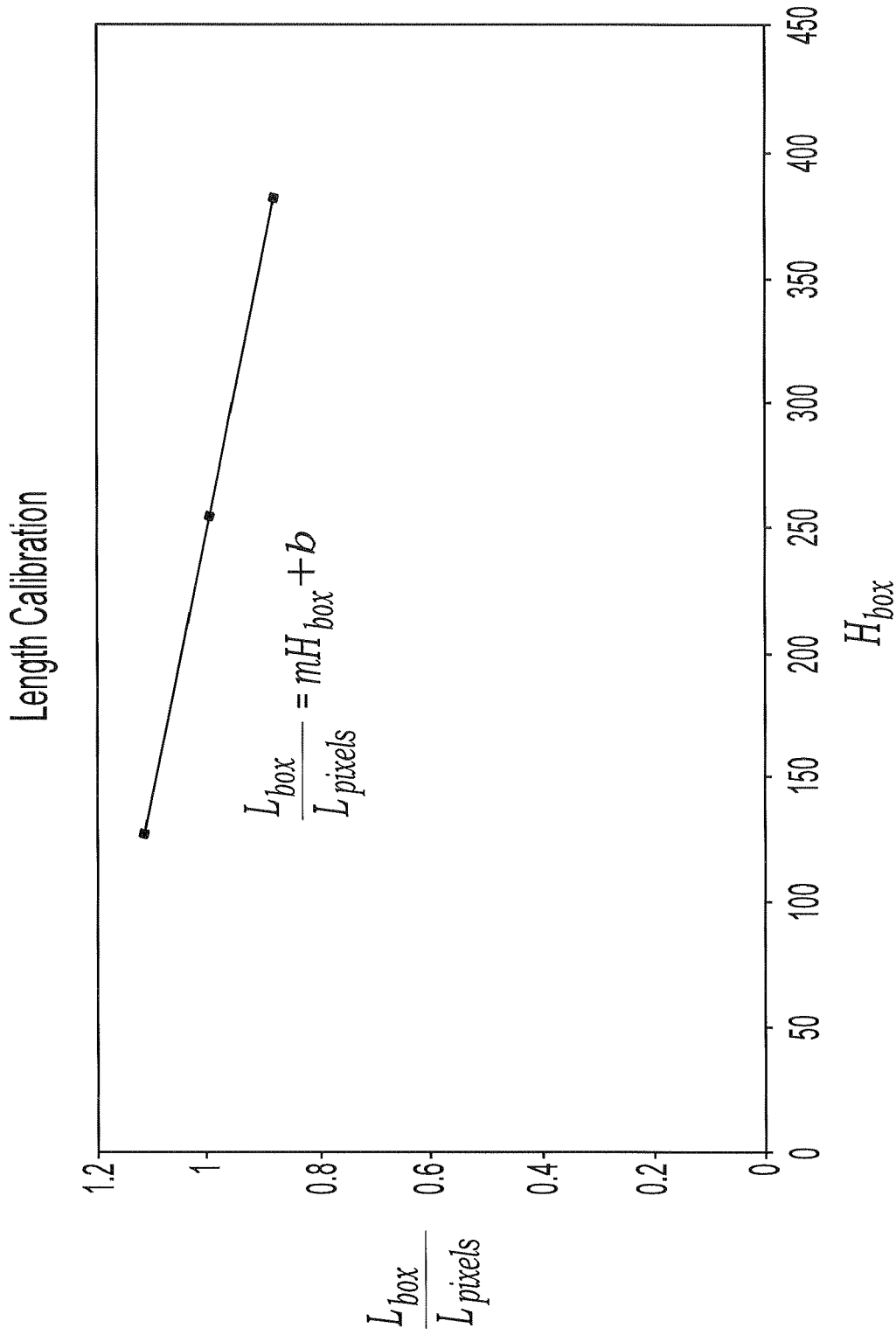
FIG. 9A is a plot illustrating the relationship of $L_{box}$ and $H_{box}$.
Figure 9B:
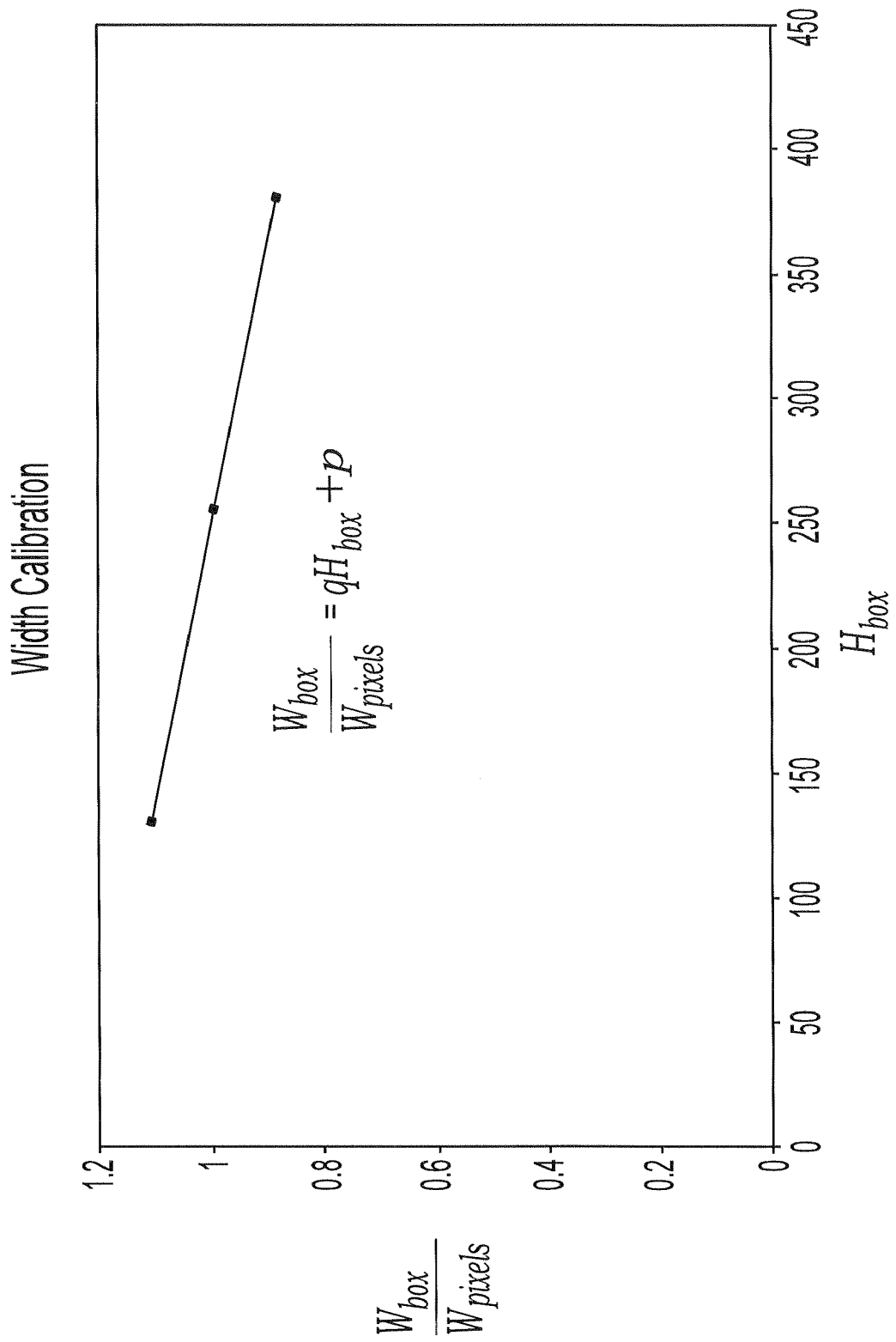
FIG. 9B is a plot illustrating the relationship of $W_{box}$ and $H_{box}$.

FIG. 9A is a plot illustrating the relationship of $L_{box}$ and $H_{box}$. The slope of the resultant linear plot is defined by m and the intercept is defined by b. Similarly, FIG. 9B is a plot illustrating the relationship of $W_{box}$ and $H_{box}$. The slope of the resultant linear plot is defined by q and the intercept is defined by p.

In accordance with an embodiment of the present invention, further on-site calibration of the system 100 may be performed upon installation of the system 100 at a point-of-sale location in the field. Such on-site calibration may be performed to correct for differences between the factory calibration and the specific set up of the system at the site. For example, if the primary image acquisition unit installed at the site is unintentionally tilted two degrees with respect to the surface of the scale (i.e., the installers can't get the angle of the unit better aligned), then on-site calibration may be performed to correct for the tilt. The on-site calibration may involve placing a calibration box on the scale, acquiring an image, and generating calibration data that may be applied to the acquired image to transform the image to correct for the tilt of the acquisition unit.

It is important to understand that the embodiments of the present system and methods described herein give two distinct advantages over a simple single-image technique. First, if only a single image of the top of the box is acquired, then it is impossible to determine the height of the box. This is due to the fact that the mapping of a point in 3 dimensions onto a point in a 2-dimensional image is not unique: an infinite number of different 3-dimensional points map onto the same image point. Second, in a single image (which is essentially in focus over the entire measurement volume) it is difficult to automate the finding of the edges of the box top, particularly if the image background (the table top and surrounds) has a complex appearance. For commercial success, a box volume measurement system should be compatible with point-of-sale environments with complex backgrounds and uncontrolled ambient lighting conditions. The techniques described herein make automated finding of the box top edges more robust.

If more accuracy of the box height measurement is required for dim weight applications, other means of determining the box height may be used. For example, an ultrasonic distance measurement device (like those used for the autofocus function of certain cameras) could be mounted directly above the box next to the cameras; by subtracting the measured distance to the box top from the known distance between the ultrasonic transmitter and the table top, the box height may be determined. As another example, a laser beam may be projected down onto the box top, with the beam slightly angled with respect to vertical, and the location of the beam in the camera images may be used to "triangulate" the box height.

In accordance with certain embodiments of the system described herein, the system is compact and located above the box to be estimated. It may be possible to install the system in most places where a scale is currently installed without disrupting the environment around the scale. Many prior art systems require sensors surrounding the box. In accordance with embodiments of the system described herein, no physical contact is made with the box, so weighing of the box is not affected. Many prior art systems require the box to be positioned against physical guides.

The processing corresponding to the various methods and algorithms described herein may be performed by a vision engine (processor) which may be built-in to an enclosed system including the cameras. Such a vision engine may take the form of a digital signal processor or a software-controlled processor, for example, in order to receive and process acquired images as described herein to estimate cuboid dimensions. Alternatively, the processing corresponding to the various methods and algorithms described herein may be performed by a personal computer (PC), for example, serial linked to the single cameras. Such a PC may send commands to control a light source (ON/OFF sequence) and image acquisition, and may receive and process acquired images as described herein to estimate cuboid dimensions.

Again, an operator may place a package to be measured on a measurement table (e.g., platform 130) or scale, or a package may be automatically forwarded to the measurement table or scale in real time via a conveyor mechanism, and then subsequently forwarded off of the table or scale by the conveyor mechanism, allowing a next box to be forwarded onto the table or scale. If a conveyor mechanism is used, the configuration 100 may further include a conveyor belt to move boxes to/from the platform 130. Furthermore, the configuration 100 may also include a sensor to determine when a box is properly positioned on the platform 130 in order to acquire images of the box at the correct instant in time. As an option, the scale that is used to weigh the box may be used as the sensor indicating the presence of the box in the measurement field of view. The configuration 100 may also acquire background images of the platform 130 before and/or after any given box has been conveyed off of the platform 130 in order to account for any changes in the background such as changes in lighting conditions and shadows over time and/or slight changes in position in the platform 130 (e.g., if the platform gets bumped). Furthermore, continuous image acquisition with motion detection may be implemented. In this manner, operator intervention may be substantially avoided during the measurement process for many successive boxes coming down the line.

The techniques and methods described herein may be readily adapted to accommodate boxes or packages having shapes other than that of a cuboid (e.g., cylindrical shapes, trapezoidal shapes) using fitting techniques corresponding to the top surfaces of those other shapes.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. An image acquisition and processing configuration to estimate the dimensions of a package, said configuration comprising:
    a primary image acquisition unit positioned at a primary acquisition location;
    a secondary image acquisition unit positioned at a secondary acquisition location which is offset from said primary acquisition location by a defined offset distance;
    a platform having a substantially horizontal top surface positioned substantially directly beneath said primary image acquisition unit such that said primary image acquisition unit is at a defined image acquisition height above said top surface of said platform; and
    a vision engine operatively connected to said image acquisition units and operable to:
        trigger said image acquisition units to acquire background images of said top surface of said platform and package images of a top surface of a package placed on said top surface of said platform,
        receive said acquired images from said image acquisition units, and
        process said received images to:
            generate a primary subtraction image and a secondary subtraction image,
            determine a spatial image shift between at least one spatially correlated common feature of said primary subtraction image and said secondary subtraction image, and
            determine an absolute height of said package using at least said spatial image shift and said image acquisition height.

2. The configuration of claim 1 wherein said platform comprises a scale operable to weigh said package placed on said top surface of said platform.

3. The configuration of claim 1 further comprising a scale having said platform resting thereon and operable to weigh said package placed on said top surface of said platform.

4. The configuration of claim 1 wherein each of said image acquisition units comprises a camera.

5. The configuration of claim 1 further comprising at least one illuminator positioned to illuminate said top surface of said platform and said top surface of said package placed on said platform, wherein said at least one illuminator is operatively connected to said vision engine and is configured to be turned on by said vision engine.

6. The configuration of claim 5 wherein said at least one illuminator and said image acquisition units operate in an infrared range of wavelengths.

7. The configuration of claim 5 wherein said at least one illuminator and said image acquisition units operate in an ultraviolet range of wavelengths.

8. The configuration of claim 5 wherein said at least one illuminator and said image acquisition units operate in a visible range of wavelengths.

9. The configuration of claim 5 further comprising a linear polarizer operatively connected to said at least one illuminator.

10. The configuration of claim 9 further comprising a cross-polarizer operatively connected to said primary image acquisition unit.

11. The configuration of claim 9 further comprising a cross-polarizer operatively connected to said secondary image acquisition unit.

12. The configuration of claim 1 wherein said configuration is configured to accommodate cuboid-shaped packages ranging in dimensions between 2 inches by 2 inches by one inch and 36 inches by 24 inches by 26 inches.

13. The configuration of claim 1 wherein said vision engine is operable to process said received images by:
  correcting each of said received images for optical distortion to form a corrected primary background image, a corrected secondary background image, a corrected primary package image, and a corrected secondary package image;
  performing edge enhancement and edge extraction on each of said corrected images to form a primary background edge image, a secondary background edge image, a primary package edge image, and a secondary package edge image;
  subtracting said primary background edge image from said primary package edge image to form said primary subtraction image;
  subtracting said secondary background edge image from said secondary package edge image to form said secondary subtraction image;
  finding a best-fit rectangle within said primary subtraction image to extract a primary rectangle representing said top surface of said package;
  finding a best-fit rectangle within said secondary subtraction image to extract a secondary rectangle representing said top surface of said package;
  spatially correlating at least one common feature of said primary rectangle and said secondary rectangle to determine said at least one spatially correlated common feature of said primary subtraction image and said secondary subtraction image;
  calculating said spatial image shift between said primary rectangle and said secondary rectangle using said at least one spatially correlated common feature;
  calculating said absolute height of said package by applying a height estimation technique using at least said calculated spatial image shift and said image acquisition height; and
  calculating an absolute length and an absolute width of said package using said calculated absolute height of said package and at least one of said primary rectangle and said secondary rectangle.

14. The configuration of claim 13 wherein said vision engine is further operable to calculate an estimated volume of said package using said absolute length, said absolute width, and said absolute height.

15. The configuration of claim 13 wherein said vision engine is further operable to binarize said primary subtraction image and said secondary subtraction image before finding said best-fit rectangles.

16. The configuration of claim 1 further comprising an optical bandpass filter operatively connected to said primary image acquisition unit to reject ambient light.

17. The configuration of claim 1 further comprising an optical bandpass filter operatively connected to said secondary image acquisition unit to reject ambient light.

* * * * *